United States Patent [19]

Fishman

[11] Patent Number: 5,793,513

[45] Date of Patent: Aug. 11, 1998

[54] FIBER OPTICS DIGITAL COMMUNICATION SYSTEM AND METHOD USING AN OPTICAL RESONATOR FOR OPTICAL SIGNAL PROCESSING

[75] Inventor: Ilya M. Fishman, Palo Alto, Calif.

[73] Assignee: The Board of Trustees of Leland Stanford Junior University, Stanford, Calif.

[21] Appl. No.: 698,020

[22] Filed: Aug. 15, 1996

[51] Int. Cl.[6] ................................................ H04B 10/16
[52] U.S. Cl. ............................................................ 359/179
[58] Field of Search ...................................... 359/174, 179

[56] References Cited

U.S. PATENT DOCUMENTS

| | | | |
|---|---|---|---|
| 4,772,854 | 9/1988 | Silberberg | 330/4.3 |
| 4,947,134 | 8/1990 | Olsson | 359/173 |
| 4,971,417 | 11/1990 | Krinsky et al. | 350/96.15 |
| 5,111,153 | 5/1992 | O'Mahony et al. | 359/336 |

*Primary Examiner*—Rodney B. Bovernick
*Assistant Examiner*—Robert E. Wise
*Attorney, Agent, or Firm*—Bella Fishman

[57] ABSTRACT

The invented method and devices address signal regeneration and all-optical switching in optical fiber transmission lines. In modern optical networks, after several stages of optical amplification, the noise accumulation requires regeneration e.g. translation to electronic domain. A new type of optical repeater and optical switch are suggested to perform regeneration and switching on the optical level. The main component of the devices is an optical cavity implanted into a section of the optical fiber and bounded by fiber gratings. In the optical repeater, the fiber cavity is nonlinear; at resonant frequency, the cavity almost totally rejects the noise and transmits the signal. In the optical switch, the fiber cavity is linear; depending on the cavity tuning, the signal may be transmitted through the cavity or reflected and redirected to an appropriate switch port.

10 Claims, 3 Drawing Sheets

FIBER OPTICS DIGITAL COMMUNICATION SYSTEM AND METHOD USING AN OPTICAL RESONATOR FOR OPTICAL SIGNAL PROCESSING

FIELD OF THE INVENTION

The present invention relates to optical communication systems, and in particular to an optical signal regeneration and all-optical switching in optical fiber transmission lines.

BACKGROUND OF THE INVENTION

In modern telecommunication systems, many operations with digital signals are performed on an optical layer. For example, digital signals are optically amplified, multiplexed and demultiplexed. In long fiber transmission lines, the amplification function is performed by Erbium Doped Fiber Amplifiers (EDFAs). The amplifier is able to compensate for power loss related to signal absorption, but it is unable to correct the signal distortion caused by linear dispersion, 4-wave mixing, polarization distortion and other propagation effects, and to get rid of noise accumulation along the transmission line. For these reasons, after the cascade of 4–5 amplifiers, every 100 to 500 km the optical signal has to be regenerated. In practice, the regeneration is performed with electronic repeaters using optical-to-electronic conversion. However to decrease system cost and improve its reliability it is desirable to develop a system and a method of regeneration, or signal refreshing, without optical to electronic conversion. An optical repeater that amplifies and reshapes an input pulse without converting the pulse into the electrical domain is disclosed, for example, in the U.S. Pat. No. 4,971,417, "Radiation-Hardened Optical Repeater". The repeater comprises an optical gain device and an optical thresholding material producing the output signal when the intensity of the signal exceeds a threshold. The optical thresholding material such as polydiacetylene thereby performs a pulse shaping function. The nonlinear parameters of polydiacetylene are still under investigation, and its ability to function in an optically thresholding device has to be confirmed.

Another function vital to the telecommunication systems currently performed electronically is signal switching. The switching function is next to be performed on the optical level, especially in the Wavelength Division Multiplexing (WDM) systems. There are two types of optical switches currently under consideration. First, there are wavelength insensitive fiber-to-fiber switches. These switches (mechanical, thermo- and electro-optical etc.) are dedicated to redirect the traffic from one optical fiber to another, and will be primarily used for network restoration and reconfiguration. For these purposes, the switching time of about 1 msec (typical for most of these switches) is adequate; however the existing switches do not satisfy the requirements for low cost, reliability and low insertion loss. Second, there are wavelength sensitive switches for WDM systems. In dense WDM systems having a small channel separation, the optical switching is seen as a wavelength sensitive procedure. A small fraction of the traffic carried by specific wavelength should be dropped and added at the intermediate communication node, with the rest of the traffic redirected to different fibers without optical to electronic conversion. This functionality promises significant cost saving in the future networks. Existing wavelength sensitive optical switches are usually bulky, power-consuming and introduce significant loss related to fiber-to-chip mode conversion. Mechanical switches interrupt the traffic stream during the switching time. Acousto-optical tunable filters (AOTFs) where the WDM channels are split off by coherent interaction of the acoustic and optical fields though fast (about 1 μsec switching time), are polarization and temperature dependent. Furthermore, the best AOTF consumes several watts of RF power, has spectral resolution about 3 nm between the adjacent channels (which is not adequate for current WDM requirements), and introduces over 5 dB loss because of fiber-to-chip mode conversions.

Another wavelength-sensitive optical switch may be implemented with a tunable Fabry-Perot filter (TFPF), as shown in FIG. 1. When the filter is aligned to a specific wavelength, it is transparent to the incoming optical power. Though the filter mirrors are almost 100% reflective no power is reflected back from the filter. With the wavelength changed or the filter detuned (for example, by tilting the back mirror), the filter becomes almost totally reflective. With the optical circulator in front of the filter, the reflected power may be redirected from the incident port. The most advanced TFPF with mirrors built into the fiber and PZT alignment actuators have only ~0.8 dB loss. The disadvantage of these filters is a need for active feedback and a reference element for frequency stability.

SUMMARY OF THE INVENTION

In the present invention, the above identified problem of the optical regeneration is addressed with a novel technique and new device based on embedding an optical resonator into the fiber core. In this technique, an optically bistable element is designed using optical fiber nonlinearity and performs in the optical domain analogous to an electronic trigger. A subject of the present invention is also a new type of a wavelength sensitive, non-interrupting optical switch embedded into the fiber plant and controlled by small external power. The main component of this device is an optical cavity embedded into the optical fiber core and bounded by two fiber gratings. To perform the repeater function, the optical power sufficient for nonlinear behavior of the optical fiber is built up in the optical cavity. At the resonant frequency, a nonlinear optical resonator almost totally rejects noise and transmits the signal. In a WDM system with many operating wavelengths, each signal passes through the dedicated resonator.

To operate as an optical switch, the resonator reflection is modulated by grating detuning or by introducing insertion loss into the optical cavity.

It is an advantage of the present invention that optical resonator is used as unified component for optical signal processing, regeneration and switching optical signals.

It is an advantage of the present invention to perform wavelength sensitive repeating of the optical signals with improving signal to noise ratio.

It is a further advantage of the present invention to perform switching of optical signal with reduced signal loss.

It is another advantage of the present invention to provide an easy to manufacture, reliable, low loss repeater of the optical signal.

Yet another advantage of the present invention is to provide a fast, reliable and built-in-fiber optical switch.

In accordance with one aspect of the present invention, there are provided a method and a device for regeneration an input optical signal for fiber optical communication system. An optical repeater comprises a section of optical fiber with built-in optical resonator. The optical resonator is formed by a pair of spaced apart fiber gratings with a fiber cavity therebetween. The fiber cavity is filled with a nonlinear medium. An optical amplifier is coupled to an input of the nonlinear optical resonator to amplify an input optical signal to a predetermined value, noise of transmitted input optical signal is suppressed by nonlinearity of the optical resonator.

In accordance with another aspect of the present invention, there is provided a method of switching the optical signal and switching device thereto. An optical switch comprises a section of optical fiber with built-in linear optical resonator which is formed by a front and a back spaced apart fiber gratings with a fiber cavity therebetween. The switch further comprises a tuner which is coupled to the back fiber grating for detuning the linear optical resonator and reflecting the input optical signal off the front fiber grating. An acoustic horn may be used to introduce internal optical loss to the linear optical resonator to reflect the input signal off the front fiber grating.

In accordance to yet another aspect of the present invention, there is provided a fiber optic device for switching optical signals in wavelength division multiplexing system. The device comprises a section of optical fiber and plurality of optical resonators which are implanted sequentially into the section of optical fiber. Each optical resonator is linear, and consists of a front and a back fiber grating with a fiber cavity therebetween. The device further comprises a plurality of tuners, each tuner being coupled to a respective back grating of the resonator for controlling the central spectral frequency of the back grating. By detuning one or more resonators, one or more optical signals are reflected off the respective front grating to a circulator for redirecting them.

The crucial difference between the teaching of the present invention and the other techniques for optical signal repeating is the improvement of the signal to noise ratio and the low-loss all-optical switching described herein relation to the drawings.

BRIEF DESCRIPTION OF DRAWINGS

The invention is described in greater detail herein in terms of non-limiting embodiments and with reference to the attached drawings, wherein.

DETAILED DESCRIPTION OF THE PREFERRED EMBODIMENTS

In this specification, the nature and theoretical concept of the present invention will be disclosed followed by engineering principles which are applicable for methods and systems for all-optical regenerating and switching in telecommunication systems.

Figure 1:
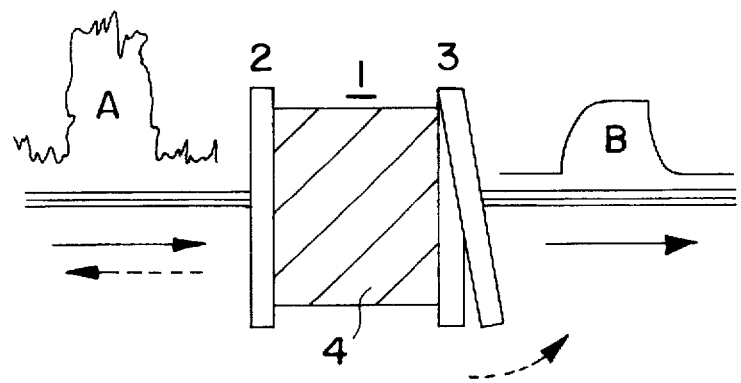
FIG. 1 is the schematic diagram of a tunable Fabry-Perot filter. The filter can be detuned by tilting the back mirror. When the resonator is detuned it becomes almost totally reflective.

The general idea of the present invention is illustrated by concept in FIG. 1 wherein Fabry-Perot tunable filter is shown as optical resonator 1 with the cavity 4 bounded by mirrors 2 and 3 and filled with nonlinear optical material 5. Depending on the optical resonator parameters it can perform as an optical repeater or an optical switch. Acting as an optical repeater, the filter cuts off the input optical signal noise and improves the signal to noise ratio as shown in FIG. 1 by curves A and B. For acting as an optical repeater, the Fabry-Perot tunable filter has to be tuned to a specific wavelength, and the required input intensity of the signal has to be provided to reveal the filter nonlinearity. Acting as an optical switch, the filter may either transmit or reflect the incident optical power. For the Fabry-Perot filter, the switching procedure is wavelength sensitive. To function as an optical switch the filter has to be tuned or detuned to a specific wavelength, which can be achieved, for example, by tilting the back mirror 3 in FIG. 1.

Figure 2A:
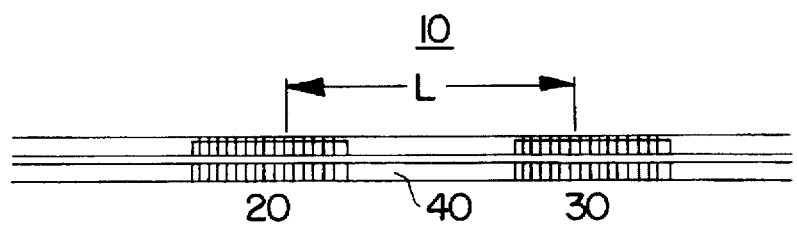
FIG. 2A is a schematic diagram of a optical fiber with the gratings 1 and 2. 1 is fiber core, and 4 is the cavity length between the gratings.

The major component of the present invention for regenerating and switching an optical signal is an optical fiber resonator. The schematic diagram of optical fiber resonator 10 is shown in FIG. 2A. Optical resonator 10 comprises a section of optical fiber 15 and two distributed reflectors separated by a distance L. The reflectors define fiber optical cavity 40. The reflectors are implemented as high efficient spectrally selective fiber gratings 20 and 30. The fiber gratings are sections of the optical fiber with periodically modulated index of refraction. In the present invention, the fiber gratings perform as reflectors having reflection coefficient 99% and greater. They may be manufactured by interfering two ultraviolet laser beams on a core of the photosensitive optical fiber or by fiber illumination through a transparent phase mask. After illumination, the refractive index n of the fiber core is $$n = n_0 + \Delta n \, [l + M \cos(2\pi z/\Lambda)]$$

where $n_0$ is the background refractive index of the unmodified core, and $\Lambda$ is the period of the grating. The index of modulation M is small ($\sim 10^{-3}$), and the high-reflective grating usually has to be several millimeters long. In resonant conditions, optical power several orders of magnitude higher then in the fiber may be built up in the optical cavity bounded by such gratings.

Depending on optical cavity 40 parameters and intensity of the input optical signal optical resonator 10 bounded by fiber gratings 20 and 30 may be linear or nonlinear. In the optical repeater embodiment shown in FIG. 2B, a nonlinear cavity 40 is employed. The noisy optical signal enters the cavity filled with fiber which works as a nonlinear optical material. The nonlinear cavity is adjusted in a way that it is almost totally reflective for the input power less than the predetermined threshold. When the input power exceeds the threshold, the energy inside the cavity is built up and saturates. The transmitted power is slightly reduced but it is less noisy than the input power. As such, the nonlinear optical resonator responds to the input signal similar to an electronic trigger.

Performance of the nonlinear optical resonator illustrated in FIG. 1 is based on the phenomenon of optical bistability. For a certain input frequency, the nonlinear resonator has two stable states. In the first (lower) state, no significant power accumulates, inside optical cavity 40; the input signal is almost totally reflected off front mirror 20. In the second (upper) state, the optical power accumulated inside cavity 40 exceeds the external power. Resonator 10 is almost transparent to the input signal, and the back reflection is small. To transit between the states, the input amplitude should exceed a preset limit. If the nonlinearity is strong enough, the nonlinear resonator not only rejects the small input (noise), but also cuts the noise off the pulse top, as it is shown in FIG. 1. To analyze the nonlinear resonator quantitatively one has to consider the electric fields inside and outside the optical cavity. Differential equations for the field amplitude and phase inside the cavity are [A. Siegman, *Lasers and Masers*, McGraw Hill, N.Y., 1968]:

$$\frac{2n_{\text{eff}} l}{c_0} \frac{dE}{dt} = -|1 - R \cdot \exp(-i\delta)|E + \sqrt{T}\, E_i(t) \quad (1)$$

$$\delta = \phi + n_2 EE^* \quad (2)$$

where $c_0$ is velocity of light in vacuum, $l$ is the resonator length, $n_{\text{eff}}$ is the index of refraction averaged over the fiber+cladding area, $\delta$ is the cavity phase mismatch due to non-ideal tuning, $\delta = l/c_0(\omega - \omega_0)$, $R$ is mirror reflectivity, and $T = (1-R)$ is mirror transmittivity. Field $E_t$ outside the resonator is $$E_t = \frac{E}{\sqrt{T}},$$

$E^*$ and $E$ are complex conjugates. In the steady state, the last relation yields, together with (1) and (2), the well known Abbe's formula [M. Born and E. Wolf, *Principles of Optics*, Pergamon Press, N.Y., 1959] for the beam intensity inside the resonator:

$$\frac{I}{I_i} = \frac{T}{T^2 + 4R \sin^2 \frac{\delta}{2}} \quad (3)$$

For high quality resonators, $T \ll 0.1$, and close to the resonance, the mismatch is small, and Eq. (3) takes the form:

$$I = \frac{TI_i}{T^2 + \delta^2} \quad (4)$$

Equation (4) describes a high quality resonator with small phase mismatch. Close to resonance (T~$\delta$), light intensity inside the cavity is large, I~$I_i/T$. For high intensity input signal, the nonlinearity of the fiber refractive index has to be taken into account. For the fiber glass (media with the inversion center), the lowest significant nonlinearity is the third order nonlinearity (Kerr effect). The nonlinear index of refraction is:

$n = n_0 + n_2 I$ where the Kerr term $n_2 I$ is small compared to $n_0$, and the refraction index is a function of the beam intensity. Close to resonance, the cavity phase mismatch is a function of beam intensity: $\delta = \phi + pI$ where $\phi$ is a linear phase mismatch and $pI$ is the nonlinear phase accumulation inside the cavity. With nonlinear phase shift, Eq. (4) yields:

$$I = \frac{TI_i}{T^2 + (pI + \phi)^2} \quad (5)$$

where the coefficient $p$ is a product of the Kerr constant $n_2$ and the cavity length $l$ ($p = n_2 l$). From Eq. (5), phase $\phi$ may be expressed as a function of I, and the relation describing nonlinear resonance is:

$$\phi = -pI \pm \sqrt{\frac{TI_i}{I} - T^2} \quad (6)$$

Figure 3:
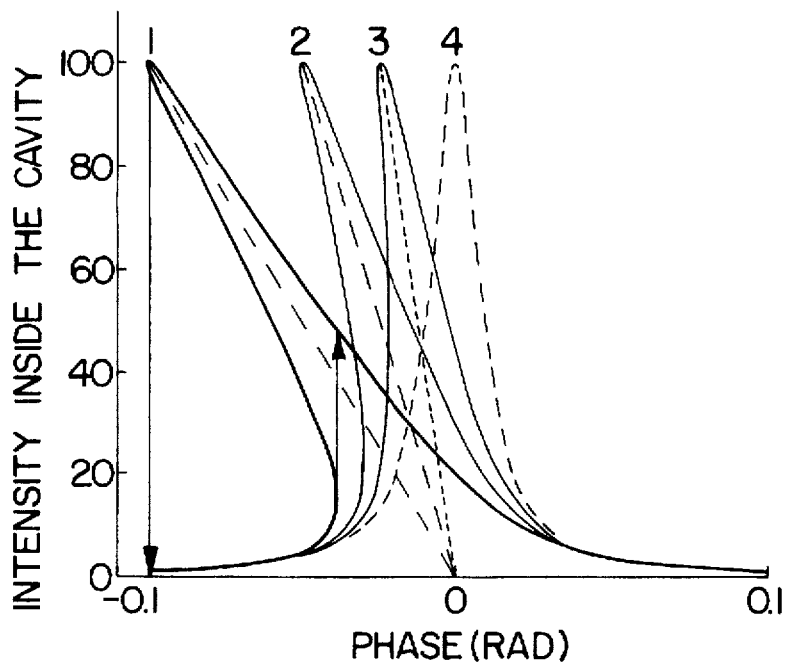
FIG. 3 shows resonant curves of the fiber resonator with Kerr nonlinearity. Amplitude hysteresis between stable resonator states is shown with vertical arrows.
Figure 4:
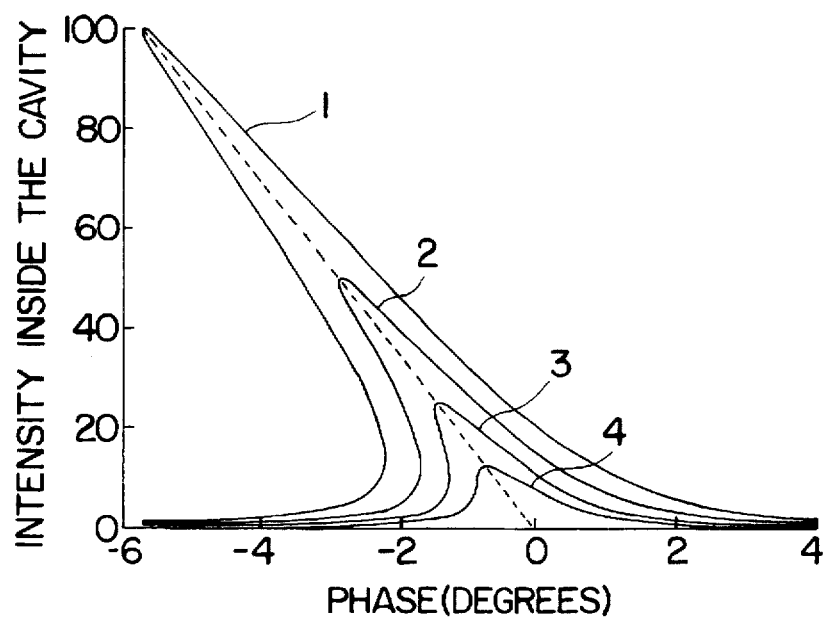
FIG. 4 shows the nonlinear response of an optical repeater to different input amplitudes.

FIG. 3 shows resonant curves of the optical repeater 25 with different parameters p. The cavity finesse for all resonators equals 100. The nonlinear parameter p is: $p=10^{-3}$ (curve 1), $p=5 \cdot 10^{-4}$ (curve 2), $p=2.5 \cdot 10^{-4}$ (curve 3), $p=0$ (curve 4). It is clear that the nonlinear resonator might exhibit, for certain phases, two stable and one unstable states typical for bistable switching elements. For example, at the phase shift 0.06 rad, the resonance curve exhibits two stable amplitudes equal to 3 and 60, and one unstable amplitude equal to 49 as shown in FIG. 3. If the frequency of the input signal changes while the amplitude remains constant, the cavity output shows an abrupt jump to higher level. For the reverse direction of the phase shift, the amplitude also drops abruptly, but at a different value of phase. This is the hysteresis phenomena, typical for all bistable elements. Manifestation of the resonator nonlinearity depends on the input amplitude. In FIG. 4, resonant curves are shown for different input amplitudes. Field amplitudes inside the cavity are 100, 50, 25 and 12, 5 units for the curves 1, 2, 3 and 4, respectively. For large amplitudes, the cavity nonlinearity and hysteresis are clearly demonstrated. However, for smaller input intensity (curves 3 and 4), the nonlinear behavior gradually disappears, and curve 4 does not show hysteresis. To cause bistability, the nonlinear phase shift accumulated inside the cavity should be close to T. It is seen from graphs of FIGS. 3 and 4 that, for significant nonlinearity, the resonant curve exhibits negative slope. When the nonlinearity becomes stronger (which occurs for longer resonator or larger Kerr constant), distinctive hysteresis inherent to bistability is observed.

The graphs of FIGS. 3 and 4 are calculated for a lossless fiber resonator with 99% reflective gratings. Calculations show that the minimum value of the grating reflection compatible with the fiber nonlinearity is 95%. These or similar data are needed for definition of the optical repeater parameters such as grating loss, cavity length and required input intensity. The optical field inside the resonator has to reach its steady state during the bit period. To analyze the transient process, one has to solve Eq. (1). The leading term in the time-dependent solution of Eq. (1) at resonance is $$I = I \exp\left(-\frac{c_0 T}{n_{\text{eff}} l} t\right)$$

which describes exponential time decay with the time constant $$\tau = \frac{n_{\text{eff}} l}{c_0 T}.$$

To resolve the digital optical signal with a time constant $\tau$ the resonator frequency spectrum $\Delta\omega$ should be wide enough, $\Delta\omega \geq 2\pi/\tau$. The value of $\Delta\omega$ defines, if the cavity length $l$ is already determined, the resonator spectral width $\delta = l\Delta\omega/c_0$, together with the grating loss T (Eq. 1).

To define the cavity length $l$, one has to fulfill the requirement for pronounced nonlinearity $n_2 U \sim T$, following from Eqs. 5 and 6. The Kerr constant $n_2$ may be obtained from independent experimental measurements, for example, R. W. Sadowski, *Nonlinear All-optical Switching in Doped Silica Fibers*, Ph. D. Thesis, Stanford University, 1995, and yields $n_2 = 2 \cdot 10^{-13}$.

Figure 2B:
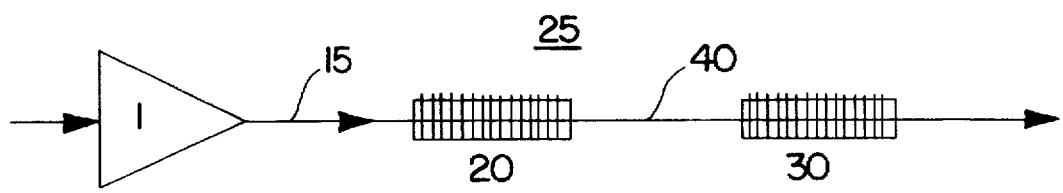
FIG. 2B is the diagram of a fiber optical repeater with EDFA 1 installed in front of the nonlinear resonator.

The above mentioned conditions for frequency spectrum and pronounced nonlinearity allows one to define, for given fiber, the cavity length $l$, the grating loss T and intensity of the input signal $I_i$. For example, if the signal is transmitted in the typical single-mode fiber with fiber diameter of 2.6µ, the maximum resonator frequency is $f_{max}=30$ MHz and the needed phase accumulation at maximum amplitude is about 1.5°, the input power should be P=100 mW, and the cavity length l is about 6 cm. For higher bit rate, the cavity length, and the grating loss should be reduced. If the grating loss T is reduced, the intensity inside the cavity grows as $I_i/T$. At the same time, the required phase shift reduces by a factor proportional to T: $n_2lI \approx T$. As a result, the required cavity length changes as $T^2$: $l \approx T^2/n_2I_i$. The cavity length reduction increases the maximum resonator frequency and reduces requirements for the laser source stability. For $f_{max} > 150$ MHz, a resonator length l>0.5 cm, and the grating loss T≦0.002, and the beam power P≈400 mW. These parameters are within the operational capabilities of existing equipment. To obtain the optical power needed by the optical repeater, fiber amplifier 1 should be introduced in front of the nonlinear cavity 40 (FIG. 2B).

Figure 5:
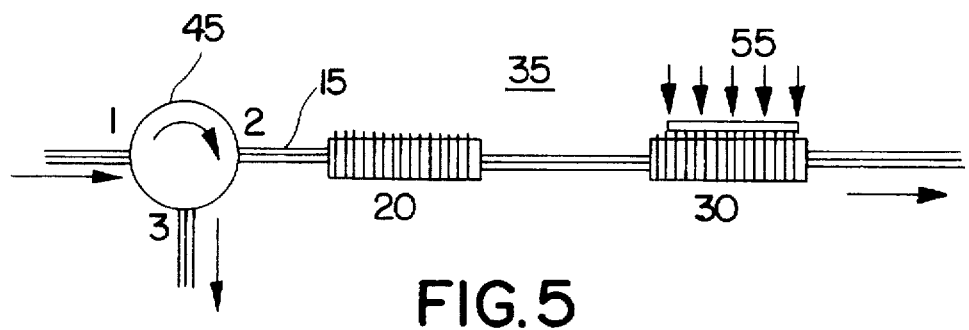
FIG. 5 shows a diagram for optical switch. Fiber gratings 20 and 30 have reflectivity over 99%. Grating 30 may be tuned by heater 55.

For the optical switch application, additional elements are introduced into the optical resonator as shown in FIG. 5. Optical switch 35 comprises a pair of fiber gratings 20 and 30, and optical circulator 45 with switch ports 1, 2, and 3. To divert an input optical signal from resonator 35 to a switch port 3, optical circulator 45 is positioned at the input port. To control the optical resonator 35 alignment tuner 55 is attached to fiber grating 30. The resonator parameters though defined by the same set of Equations (1–6) are different from the optical repeater application. In the switch application, there is no need in resonator nonlinearity, or the beam intensity may be so small that the nonlinear phase shift in Eq. (5) is negligible. Lower input power may be used for switch application than for repeater application. The switching functionality is provided by detuning the fiber resonator. Because the grating resonance is very sharp, the cavity may be detuned (for example, by heating the back grating). When the fiber grating 30 is detuned off resonance, the optical resonator 35 behaves as a solitary reflective grating. With optical circulator 45, the reflected optical power is redirected to port 3. To change fiber grating 30 reflectivity, the resonant curve of fiber grating 30 should be shifted off resonance by several Angstroms. The easiest way to accomplish that is to heat the grating. With a spectral temperature sensitivity of ~⅛ Angstrom/°C., the required temperature shift is ~20° C.

Figure 6:
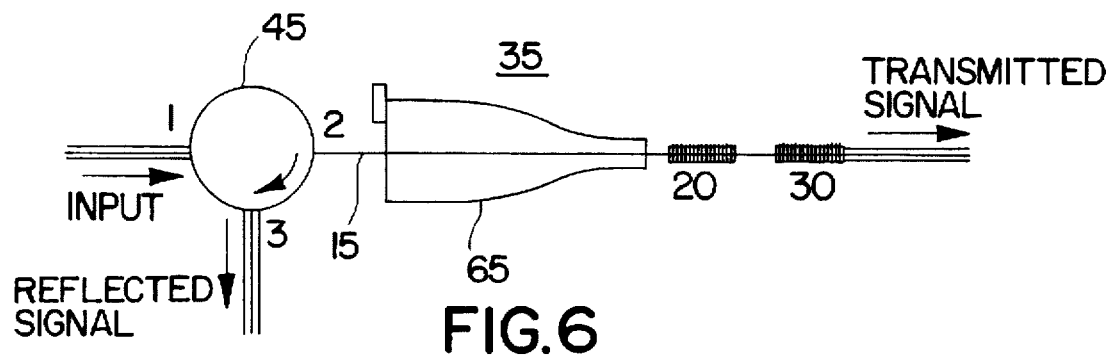
FIG. 6 shows an optical switch diagram with acoustic horn 65 introducing internal cavity loss.

Another switching option is to introduce internal loss inside the optical cavity. The diagram of a switch with variable internal loss is shown in FIG. 6. Optical switch 35 comprises a pair of gratings 20 and 30, circulator 45 and acoustic horn 65 placed between circulator 45 and front grating 20. Optical switching is monitored by inserting transverse acoustic wave into the resonator which causes internal cavity loss. For a large cavity finesse, even a small loss may be sufficient to switch the cavity from almost total transparency to 100% reflectance. If the internal cavity loss is taken into account the Eq. (4) takes the form:

$$I = \frac{TI_i}{(T + 2\alpha l)^2 + \delta^2} \quad (7)$$

In Eq. (7), the grating loss T, internal cavity loss al and phase shift δ are presumed small compared to unity. If an internal loss al is introduced in the cavity exceeds the grating loss, the optical power does not accumulate inside the cavity, $I \sim I_i/al$, and the cavity operates as a high-reflective mirror. Different physical agents may be used to introduce the internal cavity loss. An example is flexural acoustic waves interacting with the fundamental cavity mode [B. Y. Kim, J. N. Blake, H. E. Engan, and H. J. Shaw, Opt. Lett. 11, 389

(1986); O. Lisbôa, J. N. Blake, J. Oliveira, and S. L. A. Caffara, European Conference on Fiber Optic Sensors, 1990]. It was shown in literature that the interaction of flexural acoustic waves with the electromagnetic wave may almost totally convert the optical power from the fundamental mode to frequency shifted mode having orthogonal polarization. Since different electromagnetic modes propagate with different phase velocities, the acoustic field should have a spatial frequency component which matches the difference in mode propagation constants.

When the matching acoustic power is applied to the optical resonator, a fraction of the optical beam power inside the cavity is converted to the orthogonal polarization which is equivalent to inserting internal loss into the cavity. For high finesse optical resonator (small T≦0.01), this may be an insignificant fraction, and small acoustic power, respectively. With the acoustically induced loss, the resonator operates as an optical switch. The optical switching will require several milliwatts acoustic power, much less than is used thermo-optical devices or AOTFs. The principle of the switch operation is illustrated with reference to FIG. 6. To excite acoustic wave in the stripped fiber an acoustic horn is used. With no acoustic power, the resonator is low loss and transparent. When the acoustic power is applied, the internal loss increases, and the resonator operates as a reflective mirror. It was demonstrated [D. B. Patterson, M. J. F. Digonnet, A. C. Lui, B. T. Khuri-Yakub, G. S. Kino, 1990 Ultrasonic Symposium-617] that total conversion between the modes needs less than 200 mW applied power at an acoustic frequency of several MHz. To convert about 5% of the optical power, the needed acoustic power will be of the order 10 mW. The advantage of the acoustically controlled switch is its speed which is defined by the time interval needed for the acoustic wave to propagate along the optical resonator. This interval (~$10^{-6}$ sec) is approximately three orders of magnitude fasted then the expected switching time of a thermally operated switch.

For both embodiments of the optical repeater and switch, temperature stabilization is needed to keep the input signal in resonance with the fiber resonator. For the resonator of length l, and the light wavelength λ, the required temperature stability may be evaluated from the equation for the temperature dependent phase shift in the fiber $$\delta \approx \frac{2\pi l}{\lambda} \frac{dn}{dT} \Delta T$$

where the temperature dependence is caused primarily by thermal variation of the refractive index. For silica, $dn/dT \sim 10^{-5} °C.^{-1}$ in the spectral range of 1µ. Thus the temperature stability ΔT required for a 1 cm long resonator with maximum phase error 0.01 is approximately 0.15° C.

Figure 7:
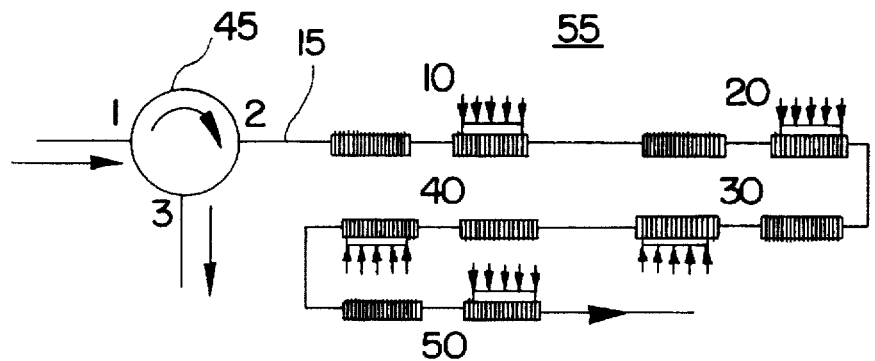
FIG. 7 shows an optical switch diagram in a 5-wavelength WDM system.

In WDM systems, several wavelengths have to be switched independently. FIG. 7 shows the switch diagram in a 5-wavelength WDM system. In switch 55, resonators 10, 20, 30, 40 and 50 tuned to wavelengths $\lambda_1, \lambda_2, \lambda_3, \lambda_4,$ and $\lambda_5$, respectively. The spectral width of the grating reflection spectrum is narrow (~0.5 nm), and each grating interacts with one wavelength only. However, a pronounced loss structure on the short wavelength side of the grating reflection peak exists due to light leaving the fiber from the side. This structure is originated by Fabry-Perot-like resonances in the cladding and determines the loss limit (~1 dB) in WDM fiber switches.

Although the invention has been described herein in its preferred form, those skilled in the art will recognize that many variations and modifications may be made thereto without departing from the spirit and scope of the invention.

What is claimed is:

1. An optical repeater for fiber-optics communication system comprising:

a section of optical fiber;

front and back spaced apart fiber gratings with a fiber cavity therebetween forming an optical resonator, said optical resonator being implanted into said section of optical fiber; and an optical amplifier coupled to said front fiber grating for amplifying an input optical signal to a predetermined value, wherein in operation a noise of the amplified optical signal is suppressed by said optical resonator.

2. The optical repeater of claim 1, wherein fiber cavity of said optical resonator comprises a nonlinear medium.

3. The optical repeater of claim 2, wherein an optical loss of each said fiber grating substantially exceeds an internal optical loss of said fiber cavity of said optical resonator.

4. The optical repeater of claim 3, wherein a nonlinear phase shift of said optical resonator is comparable to a spectral resonance width δ which is calculated according to the equation $$\delta = \frac{l}{c} \Delta\omega$$

where l is the cavity length and c is velocity of light inside the cavity.

5. The optical repeater of claim 4, wherein a value of said nonlinear phase shift of said optical resonator is defined by said predetermined value of the amplified optical signal.

6. The optical repeater of claim 5, wherein the reflection coefficient of each said fiber grating is at least 95%.

7. The optical repeater of claim 6 wherein said reflection coefficient is preferably over 99%.

8. The optical repeater of claim 7 wherein the length of each said fiber grating is of the order of about 1 mm.

9. A method of regenerating an input optical signal in fiber optics digital communication system comprising the steps of:

forming a nonlinear optical resonator in a section of optical fiber by implanting a pair of spaced apart fiber gratings and filling the space therebetween with a nonlinear optical medium;

selecting a resonant frequency of said nonlinear optical resonator substantially equal to a frequency of said input signal;

stabilizing said resonator frequency by presetting the temperature of said section of fiber;

amplifying the input optical signal by an optical amplifier coupled to an input port of said nonlinear optical resonator;

transmitting said input optical signal through said nonlinear optical resonator, whereby the noise of said input optical signal is suppressed by said nonlinear resonator.

10. The method of regenerating the input optical signal of claim 9, wherein said nonlinear optical medium is silica.

* * * * *